Patented Feb. 9, 1943

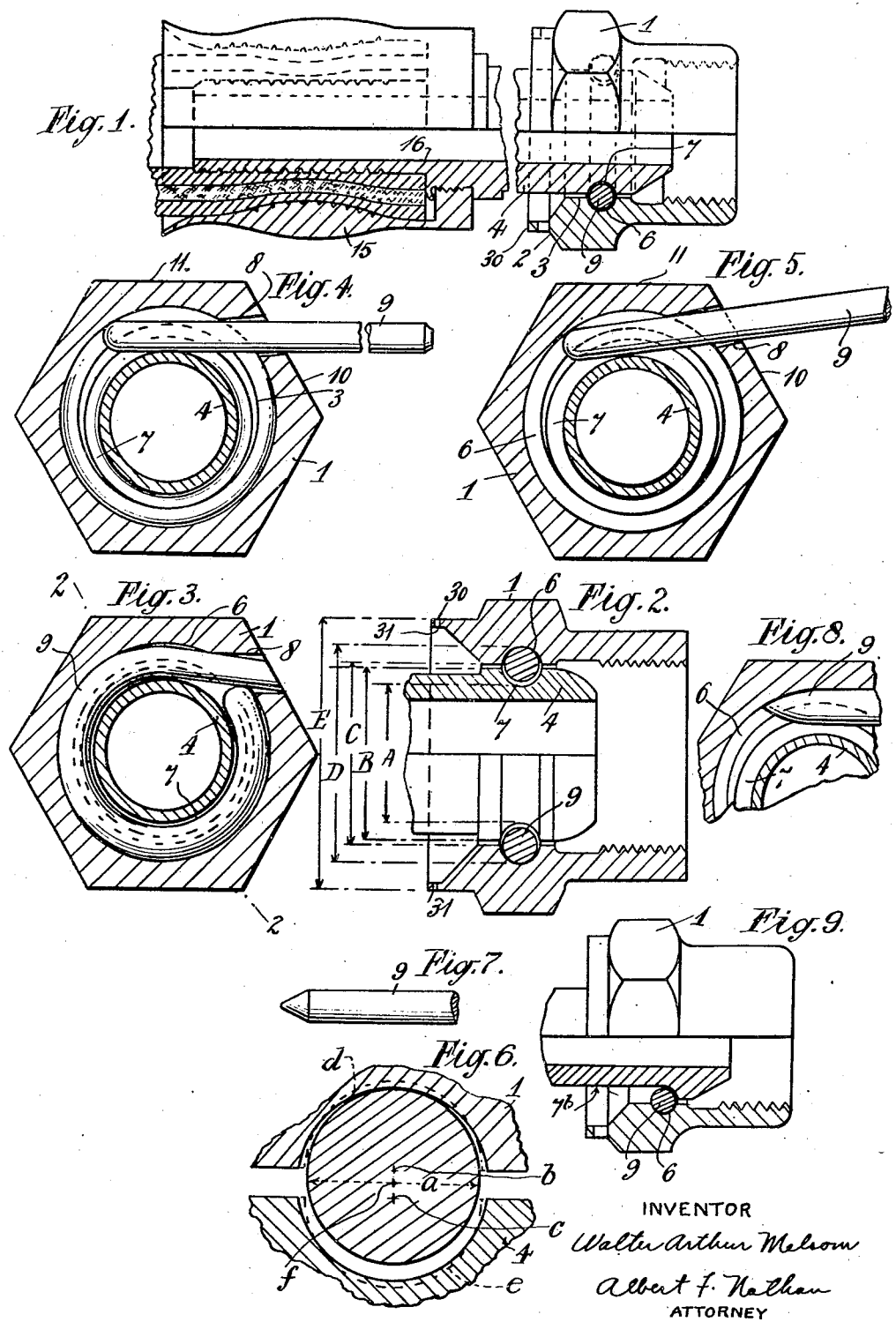

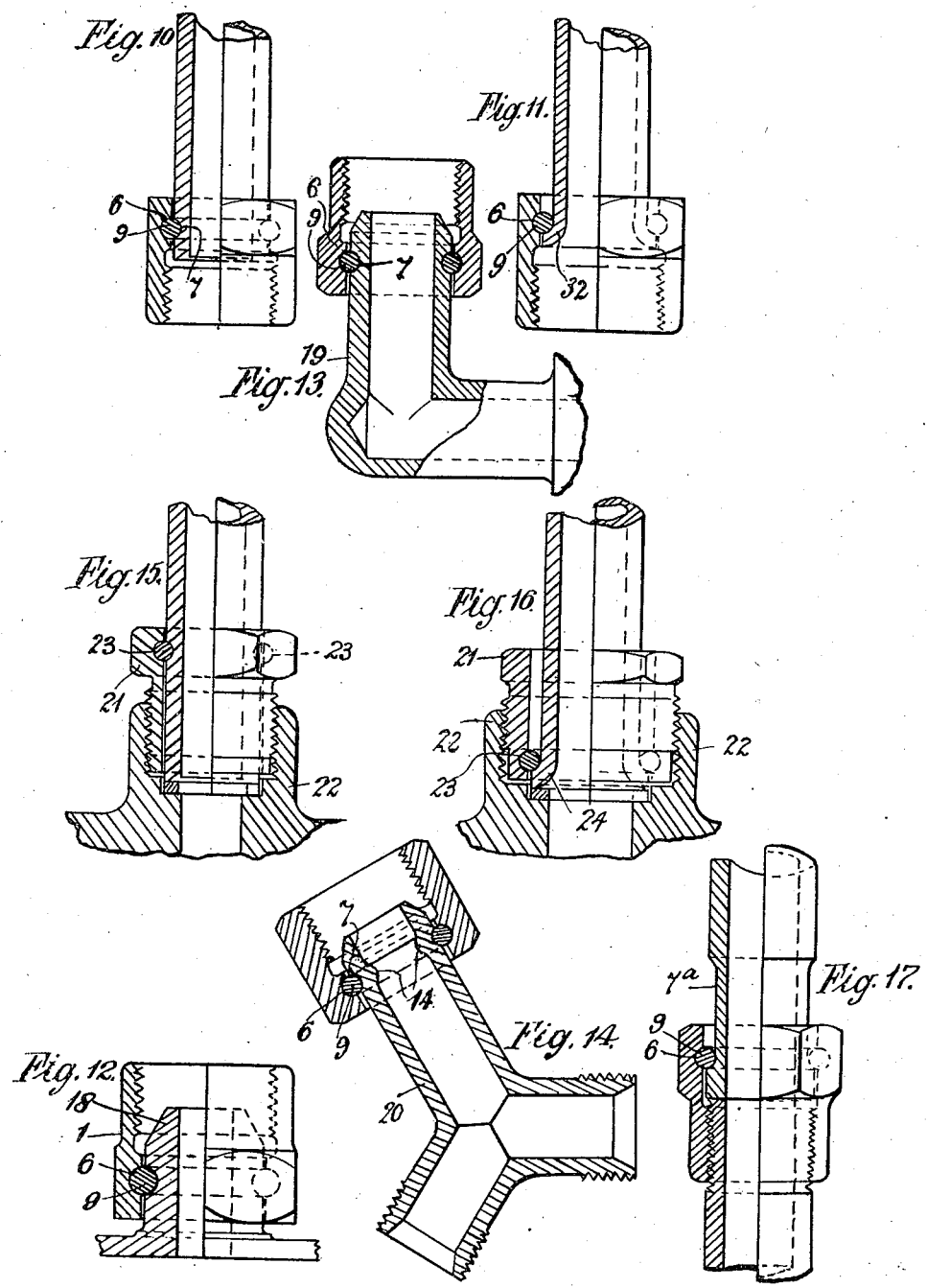

2,310,490

UNITED STATES PATENT OFFICE 2,310,490

COUPLING

Walter Arthur Melsom, London, England, assignor to Bowden (Engineers) Limited, London, England, a British company Application February 7, 1941, Serial No. 377,813
In Great Britain April 10, 1940

3 Claims. (Cl. 285—97.3)

The present invention relates to improvements in couplings of the kind in which two hollow parts are drawn into end on sealed relationship to make a metal to metal or a packed joint with one another by a screw nut cooperating with a threaded portion of one part and encircling a portion of the other part (hereinafter termed the insert) with respect to which it is relatively rotatable but is held against axial displacement while the screw thrust is being transmitted, such couplings being used for the joints of piping and in particular for medium and high pressure conduits or hoses by which in general I mean medium pressures of from 500 to 2,000 lbs. per sq. inch and higher pressures up to 15,000 or 20,000 lbs. per sq. in. Some conduits or hoses may be employed for the conveyance of gases, liquids, semi-solids or viscous substances under pressure.

In such screw-union couplings it is the practice to form the swivelling coupling nut in one piece which is threaded internally up to or towards an internal shoulder at the cap end of the nut, such shoulder in use engaging a corresponding external shoulder upon the insert, e. g., a length of pipe or the shank of the pipe union nipple, the other end or tail of which passes through a hole in the nut which is smaller than the thread diameter and large enough to permit the nut to make a running fit upon such insert.

The union is tightened by the shoulder of the coupling nut pulling against the shoulder on the insert as it is screwed upon the screw of the cooperating part of the joint.

It will be seen that as the coupling nut has internally at its cap end a diameter smaller than the external diameter of the shoulder on the insert it cannot pass over this but must be passed on from the opposite end of the insert which when a nipple, i. e., a part separate from the pipe is subsequently affixed to the pipe.

In some cases as with angle junctions these must be made in more than one part in order to receive the nut.

It will be appreciated therefore that the usual method of resisting the thrust or shear action between the nut and the insert involves complications in the manufacture of the coupling and limitations in the design and strength thereof.

I therefore use that form of connection in which a rod is inserted into an annulus passage formed by peripheral grooves on the outer surfaces of the insert and the inner surface of the nut. The screwing together of the two parts of the junction so as to form a joint capable of withstanding fluid pressures of the order above mentioned involves very considerable end thrust by the nut on the rod and an object of the present invention is to provide a rod of substantial cross-section in order that it may transmit this thrust without shearing or being crushed or deformed, and a further object of the invention is to provide a form of rod of substantial cross-section which will be less likely to distort when being curved around the annular passage.

A further object of the invention is to provide a rod of a cross-section to minimize sectional distortion but will nevertheless transmit the considerable end thrust squarely without becoming wedged between the nut and the insert and yet allow free relative rotative movement between the nut end and the insert.

A further object of the invention is to produce a rod fulfilling the foregoing objects and capable of being curved into small circles, e. g., frequently less than 1" and practically always less than 1½" in diameter.

A further object of the invention is to construct the rod, insert and nut members to facilitate the initial bending of the comparatively stiff rod and to obviate the use of elastic rods which are difficult to curve unless of small cross-section relatively to that of the passage.

Several forms of couplings constructed according to the present invention are illustrated in the accompanying drawings, in which:

Fig. 1 is a sectional elevation through one form of coupling showing a portion of the hose secured to the insert of the coupling.

Fig. 2 is an enlarged section of a slightly modified form being taken on the line 2—2 of Fig. 3 which is a cross sectional view showing the rod when driven around the passage, whilst Fig. 4 is a similar cross-section showing the rod initially entered into the passage ready for receiving the rod-shaping force.

Fig. 5 is a similar view to Fig. 4 but showing a modified arrangement of the entrance hole.

Fig. 6 is an enlarged cross-sectional view of the rod in the passage showing the preferred way of forming the registering grooves in the latter.

Figs. 7 and 8 are views of a part of a modified form of rod.

Fig. 9 is a longitudinal elevation partly in section of a variant form of the coupling.

Figs. 10 to 17 show the application of the locking rod to various other forms of couplings.

Referring to Fig. 1 the coupling nut 1 may be drilled or formed at what is normally its cap end 2 with an aperture 3 large enough to pass over the connection joint end of the pipe or nipple 4 (herein termed the insert) with a clearance as hereinafter described, this hole being generally of the same diameter as the internal diameter of the threaded portion of the nut or slightly smaller than this so as to leave a slight shoulder.

An internal annular groove 6 of part-circular cross-section is turned or provided in the wall of this hole, and an annular groove 7 of similar cross-section is formed in the external periphery of the insert 4, and these grooves register so as to form a ring-shaped passage of circular cross-section.

For leading into this passage from the outside of the nut there is formed or drilled in the wall of the nut a circular section hole 8.

When the nut has been assembled in place on the insert by being passed over the connection joint end thereof and having registered the grooves 6 and 7 to form the passage, a rod 9 of round section is then inserted guided by the hole 8 into the nut and is deformed to form a ring in the passage, being subsequently dressed off when the leading end has met the trailing end.

The rod is inserted according to the hand to which the nut is screwed, in such a direction that the action of tightening the nut tends to draw more of the rod into the nut although as the end portions of the rod meet, this cannot actually occur.

I use a rod of circular section and permanently deformable. A rod of angular, e. g., rectangular, section is liable to distortion, particularly sectional distortion, which should be kept to a minimum. An angular section also increases the difficulty of forming the entrance aperture.

The examples given later will show appropriate thicknesses of rod and proportions of parts.

I do not include in my invention or claim the use of rods which are heated for the purpose of facilitating bending.

The material of the rod must have sufficient tensile strength to prevent buckling, but such strength must not be so high that it interferes with the curving of the rod or causes it to indent injuriously the nut or insert. I find that a mild steel rod of between 25 and 40 tons per sq. inch tensile strength is particularly well suited for my purpose. The nut will be generally of the same material but this is not essential, although it is desirable to avoid using a nut of such softer material than the rod as would cause the rod to bite into the nut when being driven into the passage. The insert should be sufficiently hard to act effectively as a fulcrum. Certain non-ferrous metals will also serve, e. g., brass, gun metal, phosphor bronze and aluminium bronze. If a non-ferrous metal is to be used for the rod, it should generally be of lower tensile strength than the mild steel before prescribed, a light annealed brass of 20 tons per sq. inch tensile strength being suitable. Generally it is not desirable to use a stronger non-ferrous material than 23 tons per sq. inch tensile.

To facilitate the initial curving of the rod I prefer to proportion or arrange my parts as follows:

The hole 8 is drilled non-tangentially to the bottom of the groove in the nut so as to receive the rod with limited clearance and so guide the rod into the passage and the clearance between the insert and the nut is made fairly large so that the rod can be inserted through the hole and so far into the passage as to displace the insert into a position considerably eccentric to the nut (see Fig. 4) so that the end portion of the rod forms a solid chord in the enlarged part of the passage. When so displaced the insert forms a fulcrum for the rod, a substantial length of the rod extending beyond this fulcrum as shown diagrammatically in Fig. 4. The rod can be inserted into this position without any substantial force, e. g., can be simply pushed in by hand. When the main force is applied to the rod, the end portion can bend about the fulcrum provided by the insert and the further shaping of the rod then continued with comparative ease. The insert acts as a fulcrum to curve portions of the rod successively by the joint action of the nut and insert. A sufficient clearance is provided to enable the insert to move relatively to the nut as the point of instantaneous fulcrumming moves forward so that the depth of the passage at such point becomes substantially greater than the average.

With this arrangement, see Fig. 3, the end of the rod which first enters the passage is not bent, bending only commencing at or about the point resting on the insert when the end of the rod which has first entered the passage reaches to the interior surface of the nut, and I prefer so to arrange the parts that this unbent portion should be at least equal to the diameter of the rod. Similarly the last portion to enter the passage is not bent, the extent of these unbent portions however, is less than that of the medial portion of the rod which is bent.

One of the reasons for use of a rod of low elasticity, viz., one which is stressed beyond the elastic limit and is permanently deformed by the operation of curving it around the passage, is that a rod of higher elasticity and suitable cross-section tends to cling to the nut wall, which prevents the fulcrumming action and renders bending, and especially the inception of bending difficult, and if a small gauge wire is used to overcome these difficulties it is difficult, when practical clearances are provided, to ensure that there will be no tendency, when tightening the nut to the desired degree, to wedge such a wire between the nut and the insert and thus tend to burst the nut and/or close in the insert. A wire of too high a tensile strength is also liable to damage the nut and/or the insert.

The length of the initial chord formed by the rod will depend on the distance which separates the bottoms of the grooves in the insert and the nut where the straight leading part of the rod lies in the passage and it will be seen that this distance at the maximum is the sum of the depth of the outer groove, the depth of the inner groove, and twice the clearance between the insert and the nut. This clearance therefore makes the aforesaid distance a variable quantity, the distance being greatest when determining the length of free portion of the rod available for initial bending or curving but lessening when the insert is acting as a former.

The clearance of the rod in the entrance hole is preferably such that it can be so inserted that the presence of the insert shortens the chord which the rod could otherwise make with the bottom of the outer groove, so as to ensure that no deflection of the rod is required initially to fulcrum it on the inner part.

By way of example I give below proportions of the parts which will serve my purpose. This table should be read in conjunction with Fig. 2.

Fig. 7 in which the end of the rod is tapered, preferably to less than a right angle, e. g., to an apex angle of 60°, the apex being rounded off. Another advantageous form is illustrated in Fig. 8 in which the rod is given a conoidal

| Dia. of bore of hose | Rad. of grooves 6, 7 | Dia. of Rod 9 | Dia. A | Dia. B | Dia. C | Dia. D | Dia. E | Dia. of entrance hole 8 |
|---|---|---|---|---|---|---|---|---|
| Inches | Inches | Inches | Inches | Inches | Inches | Inches | Inches | Inches |
| 1/8 | .070 | 1/8 | 1/4 | .3195–.320 | .385–.392 | 17/42 | .600 | .128 |
| 1/4 | .070 | 1/8 | .325 | .432–.437 | .451 | .600 | .710 | .128 |
| 3/8 | .086 | 5/42 | .417 | .570–.573 | .589 | .745 | 1.002–1.010 | .159 |
| 1/2 | .086 | 5/32 | 37/64 | .720–.725 | .748 | .917 | 1.092–1.10 | .159 |
| 5/8 | .086 | 5/32 | 5/8 | .782–.787 | .811 | .969 | 1.192–1.200 | .159 |
| 3/4 | .093 | .176 | 3/4 | .921–.926 | .950 | 1.130 | 1.390 | .180 |
| 7/8 | .106 | 3/16 | 7/8 | 1.068–1.073 | 1.097 | 1.295–1.300 | 1.468–1.480 | .191 |
| 1 1/4 | .117 | 7/32 | 19/32 | 1 1/2 | 1.533 | 1.747–1.752 | 2.035–2.050 | .221 |

In curving the 1/8" diameter wire of the first example into a ring of small diameter I have found it desirable to provide the rather considerable clearance above given between the insert and the nut, but this clearance can be reduced and a good axial lock still obtained if a rod of 3/32" diameter be used.

In the form illustrated in Fig. 4, the hole 8 is made substantially tangential to the bottom of the groove in the insert when the latter has been displaced against one side of the bore of the nut. The hole 8 is drilled through the nut near to one end of the facet 10 of the hexagonal nut and parallel to and adjacent facet 11, i. e., in a thick part of the wall of the nut. In Fig. 5 the hole is drilled from a position somewhat nearer to the end of the facet 10 and at a small acute angle to the facet 11 so as to obtain still more thickness of wall through which to drill. This arrangement also gives a slight lead to the rod for moving round the passage. The non-tangential entry is advantageous for better positioning the rod during the inserting and forcing operating and for finally retaining the trailing end portion of the rod firmly in the hole in order to prevent rotational slip of the shaped rod around the bore of the nut.

I have discovered that the curving of the rod into a beam of small radius distorts the rod to an oval section with the major axis $a$ running parallel or substantially parallel to the axis of the coupling, see Fig. 7. If the grooves are made semi-circular and of little more diameter than that of the undeformed section of the rod and are struck from centres $b$, $c$ co-incident with the surface of the bore of the nut or insert periphery, see the dotted half circles $d$, $e$, Fig. 6, this sectional deformation of the rod would interfere with the desired snug housing of the rod in the outer groove and would increase the risk of the shaped rod binding on the insert. It would require a troublesome tooling operation to enlarge these grooves into an oval section to obviate this difficulty and undue slackness of the rod in the passage may result. I overcome the difficulty by describing the circle which defines the respective grooves from a common centre $f$ midway between the concentric clearance between the nut and the insert so that the grooves are correspondingly less than a half circle in cross section and enable the shaped rod to be housed snugly in the outer groove and kept free from the inner groove.

The facility with which the rod commences to deform is further aided by appropriately shaping the leading end of the rod. I may give the rod a spherical end, as shown in Figs. 3 to 5 but another form which serves well is depicted in end of a curvature approximately the same as that of the bottom of the outer groove.

I can moreover in this way obtain the desired projection of the rod beyond the fulcrum without unduly enlarging the clearances between the insert and the wall of the nut aperture. Subject to obtaining the minimum projection necessary for starting the bending of the rod and to permitting the insert to perform the shaping action, the clearance between the insert and the nut should be kept as small as possible as an undue clearance may lead to wedging of the rod between nut and insert and thereby cause such a radial thrust as may break or damage the nut or insert. The rear end of the rod may be chamfered down as shown in Fig. 4.

In the forms previously described the rod locks the nut against axial displacement in either direction along the insert and this may be of advantage when it is desired that the breaking of the screw union should assist in breaking the pipe connection, but in some cases it may be desirable for the nut to be made free to slide back over the insert in which case the groove in the insert may be of sufficient width to permit this action (see 7a, Fig. 17), or alternatively the groove may be shaped, as shown by 7a in Fig. 9. The effect of this is to provide a lateral opening in the passage which permits of the movement of the nut along the nipple in one direction, but does not prevent the wall of the passage from stopping movement of the nut in the other direction.

The external contour of the nut may be of plain hexagonal shape as shown in accordance with the standards universally adopted, or the nut may be externally shaped by turning off the hexagon locally to reduce weight or for clearance purposes as desired. Other contours of the nut are however obviously available.

In one form of coupling nut for use on aircraft pipe installations it is necessary to drill a hole or holes transversely through the corner of the hexagon to accommodate a lock wire. This operation is always relatively costly to accomplish, and although it can be done on the nut, the subject of the present invention, it is preferred, in one form thereof, to machine the cap end of the nut on its external face to the form of an annular ring 30 projecting away from the thread in an axial direction.

The present invention enables an improvement to be effected in those flexible hose couplings of the kind in which a contracted ferrule or sleeve of material 15, (Fig. 1) suited to contraction such as brass, Duralumin, low carbon steel, or phosphor bronze, clamps the hose onto an inner rigid tubular portion 16 of the insert.

The fact that the nut is secured to the insert nipple by a locking rod enables the diameter of such insert where it is engaged by the sleeve to be made greater than the limit allowed by the aperture of the standard nut. Additional wall thickness is thereby available where the joint is to be made between the insert and the aforesaid sleeve so that a strong joint can be obtained which is especially desirable in the case of medium or high pressure hydraulic couplings. In cases where the insert is desired to be screwed into such sleeve, sufficient metal is available to allow the insert to be screw threaded behind a shoulder and yet leave sufficient strength at the root of the thread to resist the internal working pressure in the hose and the radial contracting pressure clamping the hose on the insert.

When used in conjunction with such a coupling, the nut can be attached to the insert after the latter has been coupled to a hose, and all the operations incidental to making the coupling between the insert and the hose can be effected without hindrance by the presence of the nut.

The present invention also enables the provision of projecting flanges on rigid pipes to be dispensed with as it suffices to turn or otherwise provide a groove or recess in the joint end of such a pipe and to pass the union nut according to the present invention over the pipe from such joint end thereof and secure it thereon by the locking rod as hereinbefore described. Fig. 10 shows a very simple form of nut coupling illustrating this feature.

To produce the groove in the pipe the joint end of the pipe as shown in Fig. 11 may be splayed at 32 so as to form a radius shoulder with which the rod interlocks.

In cases also where, as for example in boiler work, it is necessary to make a screw-in engagement of a nipple with an internal boss formed on the boiler wall because the customary union nut must be passed onto the nipple from the tail end thereof, the present invention makes it possible to form the nipple as an external projection from the boiler or other article and to pass the nut over the nipple from the jointing end thereof, the nipple and the nut being adapted for swivelling connection by a locking rod as hereinabove described. This is illustrated in Fig. 12, where 18 is the external boss which is grooved to form with the corresponding groove in the nut the passage which receives the rod.

In a similar way with elbow, Y and other pipe fittings where the connection joint from such fittings has involved the provision therein of a sweated or screw-in nipple, the connection joint branch of such a fitting may be made stronger by increasing its wall thickness and then adapted for the swivelling connection of a union nut by a locking rod as hereinbefore described. Fig. 13 shows the coupling of the invention applied to an elbow joint 19 and Fig. 14 a Y joint 20.

Although I have hereinbefore described the union nut as of female construction, the invention can equally well be carried out with a male form of nut 21 (see Figs. 15 and 16) adapted to screw into a socket connection 22 and to draw the joint into a fluid tight condition by a locking ring 23 either located at the head of the nut (see Fig. 15) so as to trail the screw thread or at the foot of the nut (see Fig. 16) so as to lead the screw thread. An example of the last case is one in which the locking ring interlocks with a splayed joint end 24 of a pipe.

Although the recess or groove in the insert is generally formed by removing material therefrom, it may be formed by providing a projection or projections on the surface of the insert, or the groove may be formed by rolling or otherwise forming the insert without reducing the wall thickness by removal of material as shown at 14, Fig. 14.

What I claim is:

1. A coupling component suited for medium or high pressure conduits comprising a tubular insert member having an external annular groove therein and a coacting screw nut member having an internal groove arranged to register with and forming with the groove in said insert member a ring shaped passage generally circular in cross section, said nut and insert members being of an inner and outer diameter respectively as to render the said members relatively displaceable diametrically a distance slightly more than an amount normally necessary for a swivel fitting, said nut member being engageable with a screw element of the part to which the coupling component is to be joined, and said nut member also having a hole extending through the wall thereof of less diameter than the diameter of the ring shaped passage in the plane of said annular passage and in a direction tangent to the bottom of the groove in the insert member when the two members are displaced diametrically, a normally straight rod member of circular cross-section and of permanently deformable material introduced into said hole in the wall of the nut member into said passage and deformed around the passage whereby the insert member acts as a fulcrum movable with respect to the nut member and coacting with the nut member to curve successive portions of the rod beginning inwardly from the leading end thereof so that the medial and major portion of the rod is permanently deformed to the curvature of the passage leaving the rod with straight end portions, said rod so deformed, being adapted effectively to transmit the end thrust due to screwing up the nut without substantially interfering with the freedom of relative rotation of the nut and the insert.

2. A coupling component suited for medium or high pressure conduits, comprising a tubular insert member having an external annular groove therein and a co-acting screw nut member having an internal groove arranged to register with and forming with the groove in said insert member a ring shaped passage generally circular in cross section, said nut and insert members being of an inner and outer diameter respectively as to render the said members relatively displaceable diametrically a distance slightly more than an amount normally necessary for a swivel fitting, said nut member being engageable with a screw element of the part to which the coupling component is to be joined, and said nut member also having a hole extending through the wall thereof in the plane of said annular passage and in a direction chordal to the bottom of the groove in the nut, the bottom of the groove in the insert when this is diametrically displaced and the junction of the wall of the hole with the bottom of the nut groove defining bearing points of a chordal path from said hole across said passage, a normally straight rod member of permanently deformable material and of circular cross section of a diameter not exceeding the width of said path introduced into said hole and along said path and deformed around the passage whereby the insert member acts as a fulcrum movable with respect to the nut member and coacting with the nut member to curve successive portions of the rod beginning inwardly from the leading end thereof so that the medial and major portion of the rod is permanently deformed to the curvature of the passage leaving the rod with straight end portions, said rod so deformed, being adapted effectively to transmit the end trust due to screwing up of the nut without substantially interfering with the freedom of relative rotation of the nut and insert.

3. A coupling component suited for medium or high pressure conduits, comprising a tubular insert member having an external annular groove therein and a co-acting screw nut member having an internal groove arranged to register with and forming with the groove in said insert member a ring shaped passage generally circular in cross section, said nut member being engageable with a screw element of the part to which the coupling component is to be joined, and said nut member also having a hole extending through the wall thereof in the plane of said annular passage and in a direction chordal to the bottom of the groove in the nut, the bottom of the groove in the insert when this is diametrically displaced and the junction of the wall of the hole with the bottom of the nut groove defining bearing points of a chordal path from said hole across said passage, a normally straight rod member of permanently deformable material and of circular cross section of a diameter not exceeding the width of said path introduced into said hole and along said path and deformed round the passage whereby the insert member acts as a fulcrum movable with respect to the nut member and co-acting with the nut member to curve successive portions of the rod beginning inwardly from the leading end thereof so that the medial and major portion of the rod is permanently deformed to the curvature of the passage leaving the rod with straight end portions, said nut and insert members being of an inner and outer diameter respectively as to render the said members relatively displaceable diametrically so that the radial clearance between the nut and insert members at the point of initial fulcrumming is considerably greater than that which would be present between the rod and the bottom of the passage in the nut when the grooves are brought together, said rod so deformed, being adapted effectively to transmit the end thrust due to screwing up the nut without substantially interfering with the freedom of relative rotation of the nut and insert.

WALTER ARTHUR MELSOM.